(12) United States Patent
Zhong et al.

(10) Patent No.: US 12,499,104 B2
(45) Date of Patent: Dec. 16, 2025

(54) MAP MANAGEMENT SYSTEM

(71) Applicant: TOYOTA JIDOSHA KABUSHIKI KAISHA, Toyota (JP)

(72) Inventors: Lei Zhong, Chuo-ku (JP); Jing Ma, Yokohama (JP); Xiao Shao, Kawasaki (JP); Ryokichi Onishi, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/597,003

(22) Filed: Mar. 6, 2024

(65) Prior Publication Data

US 2024/0346009 A1   Oct. 17, 2024

(30) Foreign Application Priority Data

Apr. 12, 2023   (JP) ................... 2023-064926

(51) Int. Cl.
*G06F 16/20*   (2019.01)
*G06F 16/23*   (2019.01)
*G06F 16/29*   (2019.01)

(52) U.S. Cl.
CPC .......... *G06F 16/2365* (2019.01); *G06F 16/29* (2019.01)

(58) Field of Classification Search
CPC ............................ G06F 16/2365; G06F 16/29
See application file for complete search history.

(56) References Cited

U.S. PATENT DOCUMENTS

2020/0042012 A1\* 2/2020 Zander ................ G06F 16/27
2022/0038527 A1 2/2022 Zhong

FOREIGN PATENT DOCUMENTS

JP   2020-523579 A   8/2020
JP   2022-24830 A    2/2022

\* cited by examiner

*Primary Examiner* — Kristopher Andersen
(74) *Attorney, Agent, or Firm* — Oblon, McClelland, Maier & Neustadt, L.L.P.

(57) ABSTRACT

A map management system includes a plurality of servers that manage map data of a predetermined area. The plurality of servers each include: a storage that records a block chain; and a processor that stores, in the block chain, map update data for updating the map data, the map update data being generated based on data collected from a plurality of vehicles traveling in the area. The processor conducts verification of whether or not a plurality of pieces of map update data satisfy a predetermined verification policy by using a framework of the block chain, and updates the map data by selectively using map update data determined, as a result of the verification, as satisfying the verification policy and thus being valid, among the plurality of pieces of map update data.

2 Claims, 7 Drawing Sheets

MAP MANAGEMENT SYSTEM

CROSS REFERENCE TO RELATED APPLICATIONS

This nonprovisional application is based on Japanese Patent Application No. 2023-064926 filed on Apr. 12, 2023 with the Japan Patent Office, the entire contents of which are hereby incorporated by reference.

BACKGROUND

Field

The present disclosure relates to a map management system, and more particularly, to a map management system to which a block chain technology is applied.

Description of the Background Art

In map management systems, it has been proposed to apply the block chain technology to manage map data updates. For example, in a map management system disclosed in Japanese Patent Laying-Open No. 2022-24830, a cloud server and an edge server constituting a block chain store update history of map data based on map update data.

SUMMARY

There is always a demand for highly accurate map data. The map management system disclosed in Japanese Patent Laying-Open No. 2022-24830 has room for improvement in accuracy (correctness) of map data.

The present disclosure is made to solve the above problem, and it is an object of the present disclosure to improve the accuracy of map data.

(1) A map management system according to an aspect of the present disclosure includes a plurality of servers that manage map data of a predetermined area. The plurality of servers each include: a storage that stores a block chain; and a processor. The processor generates a plurality of pieces of map update data for updating the map data, based on vehicle data collected from a plurality of vehicles traveling in the area, and stores the plurality of pieces of map update data in the block chain. The processor conducts verification of whether or not the plurality of pieces of map update data satisfy a predetermined verification policy, and updates the map data by selectively using map update data determined, as a result of the verification, as satisfying the verification policy and thus being valid, among the plurality of pieces of map update data.

In the above configuration (1), map update data determined as being valid as a result of the verification is selectively used to update the map data. Since only the map update data determined as being valid is used, the accuracy of the map data can be improved, according to the above configuration (1).

(2) The processor executes a smart contract implemented using a framework of the block chain, to conduct the verification.

According to the above configuration (2), the validness (integrity, availability, etc.) of the map update data can be improved and the traceability can be improved, by using the smart contract which is implemented using the framework of the block chain.

(3) The processor stores, in the block chain, the plurality of pieces of map update data regardless of whether or not the plurality of pieces of map update data are valid.

According to the above configuration (3), it is possible to improve the validness of even the map update data determined as being invalid as a result of the verification, and improve and the traceability.

(4) The processor determines map update data that satisfy: the number of vehicles from which associated vehicle data is collected is larger than a reference number; and a ratio of the map update data that match each other is higher than a reference ratio, as being valid, among the plurality of pieces of map update data.

According to the above configuration (4), since it is appropriately determined whether or not the reliability of the plurality of pieces of map update data is high, the accuracy of the map data can further be improved.

(5) The plurality of servers include a cloud server and a plurality of edge servers. The plurality of edge servers each generate the plurality of pieces of map update data based on the vehicle data collected from the plurality of vehicles, and broadcast transaction data including the plurality of pieces of map update data to share the plurality of pieces of map update data between the cloud server and the plurality of edge servers.

According to the above configuration (5), the edge computing technology is applied to the map management system. Thus, since the edge server takes charge of the processing relating to the map update data, the processing load of the cloud server can be reduced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, embodiments of the present disclosure will be described in detail with reference to the accompanying drawings. In the drawings, the same or corresponding parts are denoted by the same reference numerals, and the description thereof will not be repeated.

EMBODIMENTS

<System Configuration>

Figure 1:
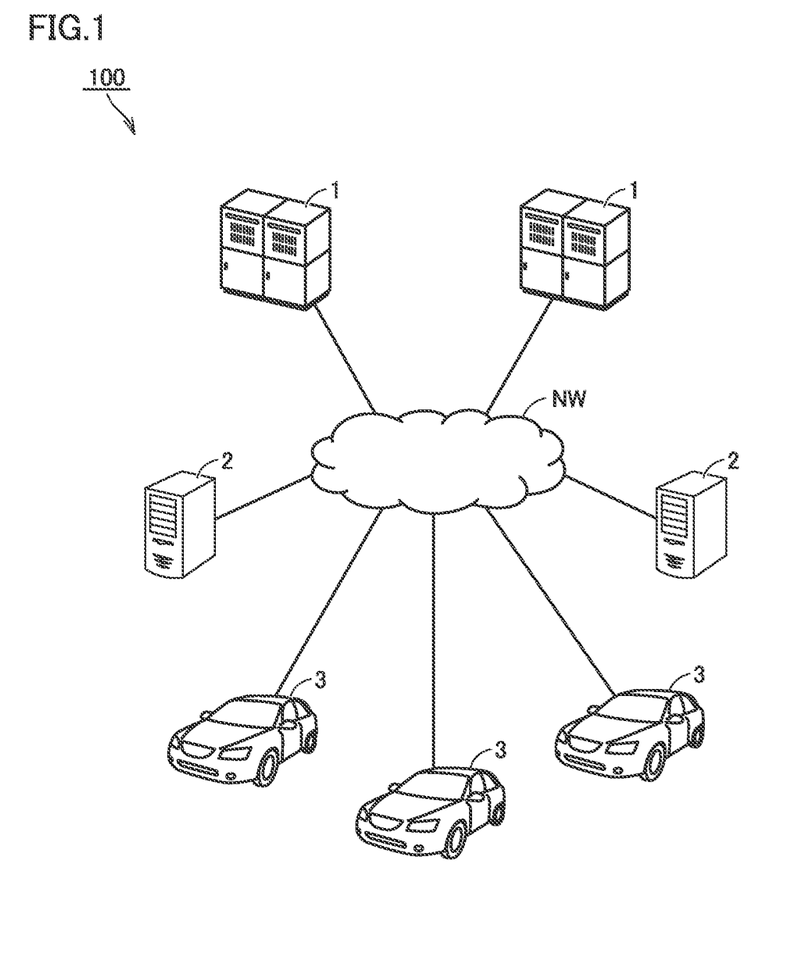
FIG. 1 is a diagram showing an overall configuration of a map management system according to an embodiment of the present disclosure.

FIG. 1 is a diagram showing an overall configuration of a map management system according to an embodiment of the present disclosure. The map management system 100 manages the update of the high precision map using the block chain technology. Hereinafter, data of a high-precision map will be referred to as "map data". Data used for updating the map data is referred to as "map update data".

The map management system 100 includes at least one cloud server 1, a plurality of edge servers 2, and a plurality of vehicles 3. At least the cloud server 1, the plurality of edge servers 2, and the plurality of vehicles 3 have communication functions, and are configured to be able to communicate with each other through the network NW.

The server (cloud server 1 and/or edge server 2) collects data on a target point (a road on which the vehicle 3 is traveling) from the vehicle 3. This data is referred to as "raw data". The raw data includes, for example, image data of a road around the vehicle 3, sensor data acquired by the vehicle 3, image data in the vehicle, and the like. Examples of the sensor used to acquire the sensor data include a vehicle speed sensor, an acceleration sensor, a GPS (Global Positioning System) sensor, LiDAR (Light Detection and Ranging), a millimeter wave sensor, a temperature sensor, a humidity sensor, and an atmospheric pressure sensor. The server detects road changes based on the collected data. The server generates map update data based on the detected road changes, and updates the map data using the map update data. Then, the updated map data is transmitted to the vehicles traveling in the area including the target point.

Figure 2:
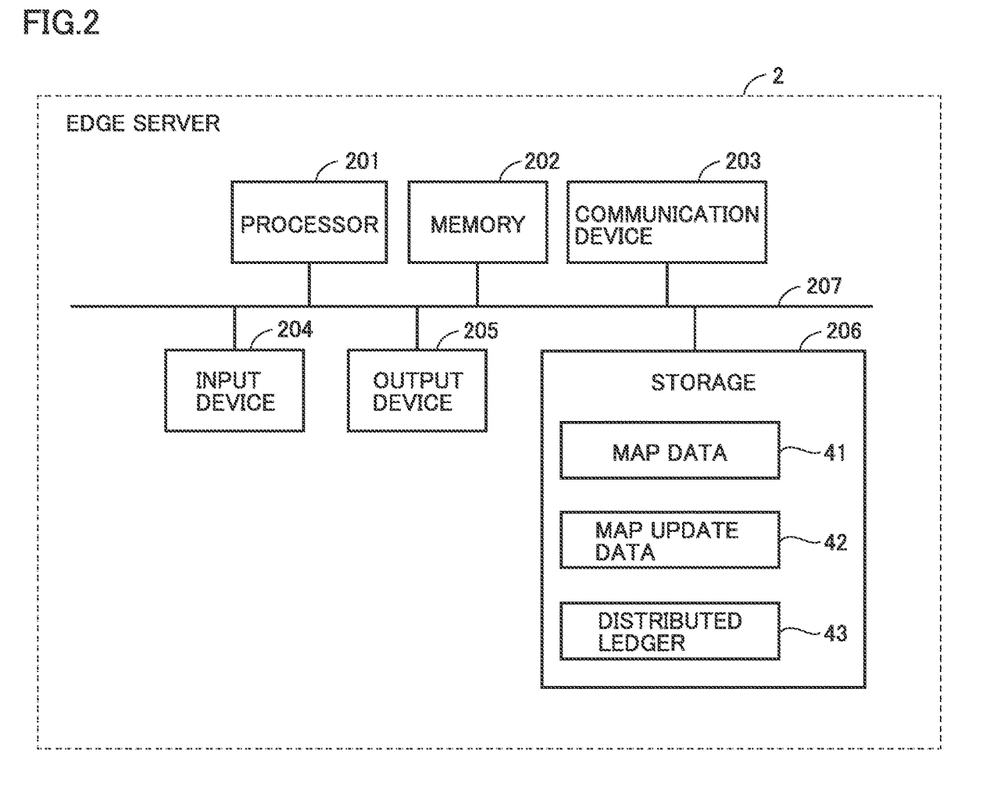
FIG. 2 is a diagram showing a typical configuration of an edge server.

FIG. 2 is a diagram showing a typical configuration of the edge server 2. The edge server 2 includes a processor 201, a memory 202, a communication device 203, an input device 204, an output device 205, and a storage 206. The components of the edge server 2 are communicably connected to each other by a bus 207. Although not shown, a typical configuration of the cloud server 1 may be the same as the following configuration of the edge server 2.

The processor 201 is an arithmetic processing unit such as a CPU (Central Processing Unit) or an MPU (Micro-Processing Unit). The memory 202 includes a ROM (Read Only Memory) and a RAM (Random Access Memory). The memory 202 stores a system program including an OS (Operating System) and a control program including computer-readable codes necessary for control operation. The processor 201 reads out the system program and the control program, deploys them in the memory 202, and executes them, thereby realizing various processes.

The communication device 203 communicates with an external device of the edge server 2. The external device includes at least one cloud server 1, other edge servers, a plurality of vehicles 3, and the like. The input device 204 is a device capable of receiving an operation by a user, and includes a mouse, a keyboard, a touch panel, and the like. The output device 205 is a device capable of providing information to a user, and is typically a display.

The storage 206 is a rewritable storage device, such as an HDD (Hard Disk Drive), an SSD (Solid State Drive), or a flash memory. The storage 206 stores map data 41, map update data 42, and a distributed ledger 43.

In the present embodiment, an edge server is provided for each area. The map data 41 is, for example, a relational database in which map data of an area assigned to the edge server 2 is stored so as to be able to be retrieved. The map update data 42 is data indicating a change (difference between the map data and the previous map data) of the map data, resultant from a change of a target point such as a road. In this example, as described later, the map update data 42 is acquired by the edge server 2. The distributed ledger 43 is a block chain ledger and stores map update data 42.

<Map Data Update>

Figure 3:
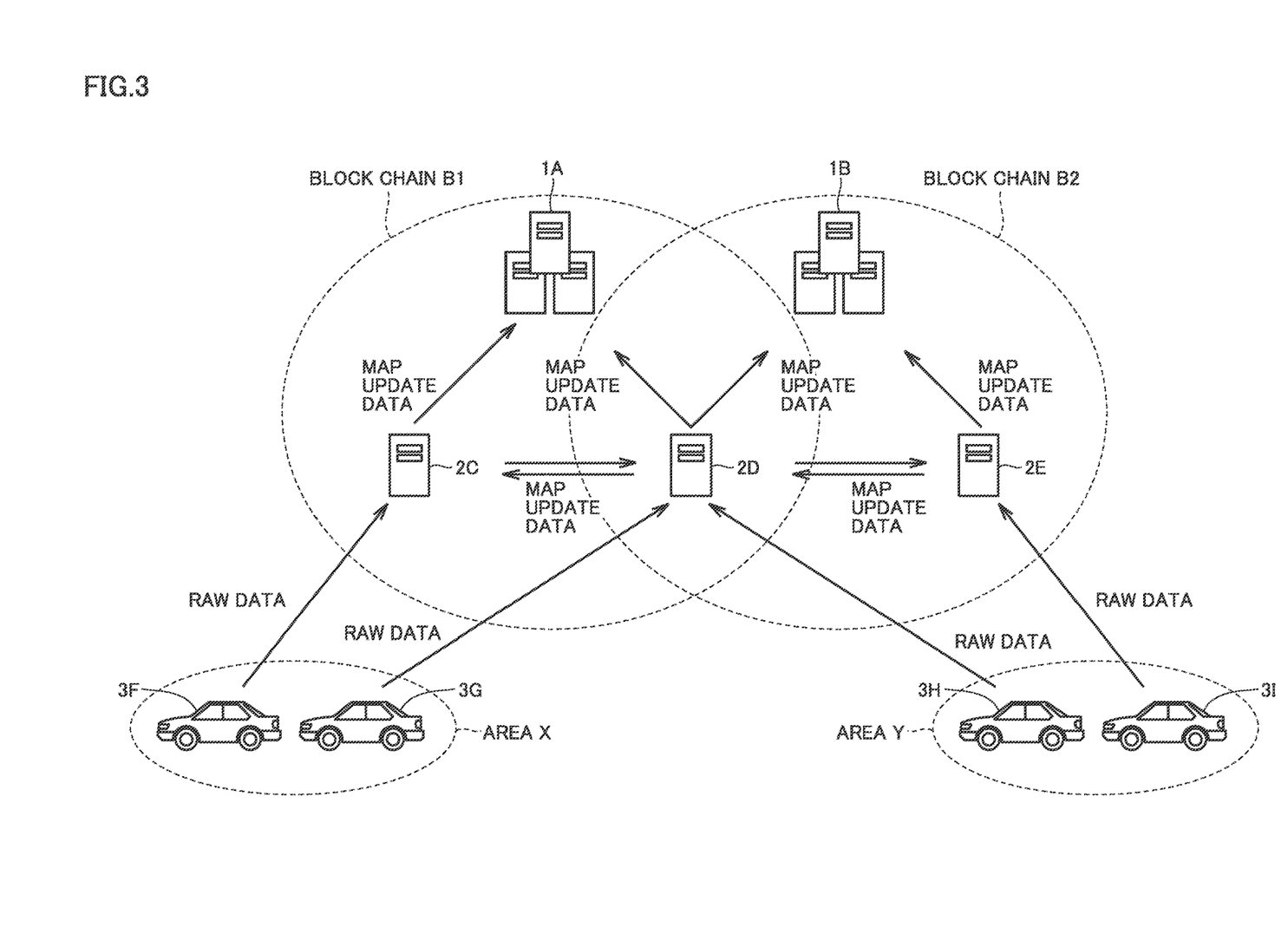
FIG. 3 is a diagram illustrating an outline of a map data updating process by the map management system.

FIG. 3 is a diagram illustrating an outline of a map data updating process by the map management system 100. In this example, the map management system 100 includes two cloud servers 1A and 1B, three edge servers 2C, 2D, and 2E, and four vehicles 3F, 3G, 3H, and 3I.

The edge servers 2C and 2D are provided in (or near) the area X. The vehicles 3F and 3G travel in the area X. The cloud server 1A, the edge server 2C, and the edge server 2D update the map data of the area X based on the raw data collected from the vehicles 3F and 3G.

More specifically, the vehicle 3F transmits the raw data collected from the target point to the edge server 2C. The edge server 2C generates map update data from the raw data, and transmits the generated map update data to the edge server 2D and the cloud server 1A. Similarly, the vehicle 3G transmits the raw data collected from the target point to the edge server 2D. The edge server 2D generates map update data from the raw data, and transmits the generated map update data to the edge server 2C and the cloud server 1A. Thereby, the map update data is shared between the cloud server 1A, the edge server 2C, and the edge server 2D. The cloud server 1A and the edge servers 2C and 2D manage the map update data using the block chain B1.

The edge servers 2D and 2E are provided in (or near) the area Y. The vehicles 3H and 3I travel in the area Y. The cloud server 1B, the edge server 2D, and the edge server 2E update map data of the area Y based on raw data collected from the vehicles 3H and 3I.

More specifically, the vehicle 3H transmits the raw data collected from the target point to the edge server 2D. The edge server 2D generates map update data from the raw data, and transmits the generated map update data to the edge server 2E and the cloud server 1B. Similarly, the vehicle 3I transmits the raw data collected from the target point to the edge server 2E. The edge server 2E generates map update data from the raw data, and transmits the generated map update data to the edge server 2D and the cloud server 1B. Thereby, the map update data is shared between the cloud server 1B, the edge server 2D, and the edge server 2E. The cloud server 1B and the edge servers 2D and 2E manage the map update data using the block chain B2.

Thus, the block chain technology is applied to the map management system 100. For each local area, map update data is shared between the cloud server 1 and the edge server 2, and is stored by a block chain. Thereby, the update history of the map data can be recorded.

The edge computing technology is applied to the map management system 100. Thus, concentration of processing load on some servers (especially the cloud server 1) can be prevented, and the processing load of the server can be reduced. However, in the present embodiment, application of the edge computing technology is not essential.

<Functional Blocks>

Figure 4:
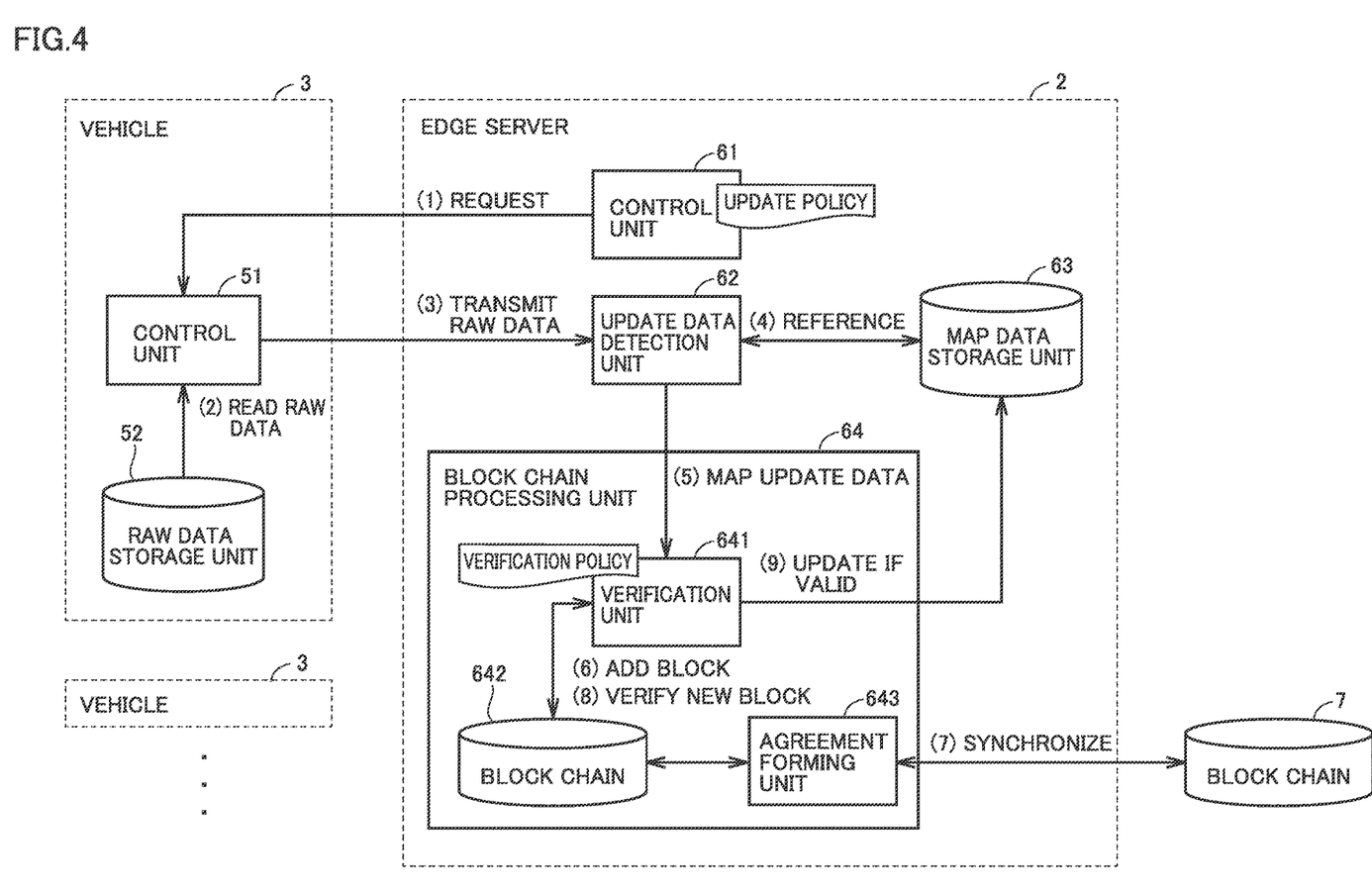
FIG. 4 is a functional block diagram relating to main functions of the edge server and the vehicle according to the present embodiment.

FIG. 4 is a functional block diagram relating to main functions of the edge server 2 and the vehicle 3 in the present embodiment. The vehicle 3 includes a control unit 51 and a raw data storage unit 52. The control unit 51 issues an instruction to other functional blocks of the vehicle 3, and exchanges a request with a device other than the vehicle (the edge server 2 in this example). The raw data storage unit 52 stores raw data collected during traveling of the vehicle 3.

The edge server 2 includes a control unit 61, an update data generation unit 62, a map data storage unit 63, and a block chain processing unit 64. The block chain processing unit 64 includes a verification unit 641, a block chain storage unit 642, and an agreement forming unit 643.

The control unit 61 issues an instruction to other functional blocks of the edge server 2, and exchanges a request with a device other than the edge server (the vehicle 3 in this example). The control unit 61 has an update policy defining which condition should be satisfied for updating map data. The control unit 61 requests the control unit 51 of the vehicle 3 to transmit the raw data according to the update policy (see (1)). The control unit 51 of the vehicle 3 reads the raw data stored in the raw data storage unit 52 in accordance with a request from the control unit 61 of the edge server 2 (see (2)). Then, the control unit 51 transmits the raw data to the update data generation unit 62 of the edge server 2 (see (3)). Although FIG. 4 shows only a configuration in which raw data is acquired from one vehicle, for convenience of the drawing, actually, a plurality of pieces of raw data are acquired from a plurality of vehicles in the same manner.

The update data generation unit 62 generates map update data based on each of a plurality of pieces of raw data acquired from a plurality of vehicles 3. More specifically, the map data storage unit 63 stores map data (current latest data). The update data generation unit 62 refers to the map data storage unit 63 and acquires map data of the target point (point corresponding to the raw data) (see (4)). The map data storage unit 63 compares the raw data of the same target point with the map data to determine whether or not the target point has changed. When it is determined that the target point has changed, the update data generation unit 62 generates map update data relating to the target point. Then, the update data generation unit 62 outputs the map update data to the verification unit 641 (see (5)).

In the present embodiment, the verification process of map update data is integrated into a block chain mechanism. In other words, a verification process of map update data is defined in the smart context. As a block chain infrastructure technology (framework) for executing the smart context, for example, Hyperledger Fabric can be used. However, the framework is not limited thereto, and other frameworks may be adopted.

First, the verification unit 641 generates transaction data for adding map update data from the update data generation unit 62 to the block chain (see (6)). The generated transaction data is broadcast to the network NW. Thus, the transaction data is propagated, and the other servers (the cloud server 1 and the other edge servers) receive the transaction data.

Subsequently, for a newly added block, the agreement forming unit 643 performs agreement forming between the edge server 2 and the other servers using the existing framework of the block chain. As one specific example, a hypeledger fabric endorsement mechanism may be used. When an agreement is made between the edge server 2 and the other servers, a block is added to the block chain of each of the other servers. In other words, the block chain is synchronized between the edge server 2 and the other servers (see (7)).

Thereafter, the verification unit 641 verifies whether or not the map update data in the newly added block is valid in accordance with a predetermined verification policy (see (8)). The verification policy may be determined based on, for example, the number of vehicles from which raw data is acquired, the matching ratio of map update data, and the like. When a plurality of pieces of map update data are generated based on a plurality of pieces of raw data collected from a plurality of vehicles, differences may occur among the plurality of pieces of map update data due to various error factors. The matching ratio of the map update data is a ratio indicating how many pieces of map update data match each other. If all map update data are equal to each other, the matching ratio is 100%. If all map update data are different from each other, the matching ratio is 0%.

In the present embodiment, when the number of vehicles from which the raw data is acquired is larger than a reference number and the matching ratio of the map update data is higher than a reference ratio, it is determined that the map update data is valid. More specifically, the reference number of vehicles is 10, for example, and the reference ratio of map update data is $2/3 \approx 67\%$, for example. In this case, when raw data is acquired from ten or more vehicles and the matching ratio of map update data generated from the acquired raw data is 67% or more, it is determined that the matching map update data are valid. In contrast, when raw data is collected only from less than nine vehicles, the map update data generated from the raw data is determined as being invalid. In addition, when the matching ratio of the map update data is less than $1/3 \approx 33\%$, it is also determined that the map update data is invalid even if they match each other.

When the map update data is determined as being valid, the verification unit 641 updates the map data using the valid map update data (see (9)). On the other hand, the verification unit 641 does not use the invalid map update data for updating the map data.

As described above, in the present embodiment, map data is updated by selectively using map update data determined as being valid as a result of the verification. Whether or not the map update data is valid is determined, like the voting scheme, based on the number of vehicles from which the raw data is acquired (the number of valid votes) and the matching ratio of the map update data (the vote ratio). This makes it possible to select appropriate reliable map update data, thereby improving the accuracy of map data.

In addition, in the present embodiment, map update data to be verified is stored in the block chain, and after being stored in the block chain, the map update data is verified. That is, regardless of whether the map update data is valid or invalid, all map update data are stored in the block chain. This ensures the validness (integrity, availability, etc.) of the map update data to be verified, as well as the traceability.

<Processing Sequence>

Figure 5:
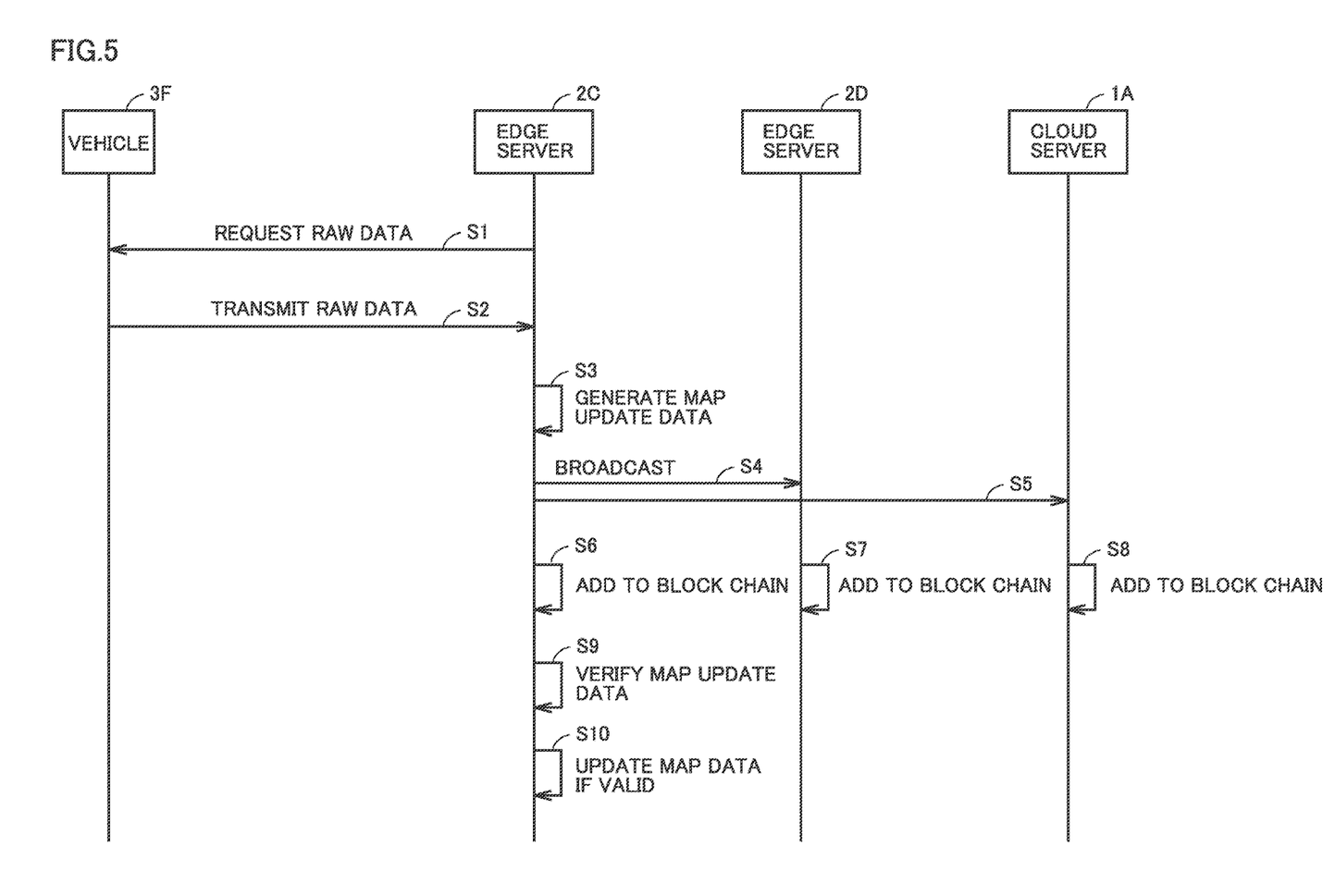
FIG. 5 is a sequence diagram showing a processing procedure for updating map data according to the present embodiment.

FIG. 5 is a sequence diagram showing a processing procedure for updating map data according to the present embodiment. Here, an example of the block chain B1 shown on the left side of FIG. 3 will be described. In FIG. 5, processing executed by the vehicle 3F, the edge server 2C, the edge server 2D, and the cloud server 1A is described from the left to the right. Although each process is implemented by software processing by the processor, it may be implemented by hardware (electrical circuitry) disposed in the processor. Hereinafter, the sequence is abbreviated as S.

In S1, the edge server 2C requests the vehicle 3F to transmit raw data. The edge server 2C may appropriately specify what target point (spatial range) and time period (temporal range) of raw data is requested to the vehicle 3F. When the map data of a certain area has not been updated for a certain period of time, the edge server 2C may request the vehicle 3F traveling in the certain area to transmit the raw data collected during the period from the previous update of the map data to the current time. Alternatively, when the edge server 2C acquires information indicating that a failure, an accident, or the like has occurred in a certain area, the edge server 2C may request the vehicle 3F traveling in the same area to transmit raw data. By obtaining the raw data from the vehicle 3 using a request from the edge server 2 as a trigger, map update data is generated only when necessary. Thus, the processing load of the edge server 2 can be reduced.

In S2, in response to the request from the edge server 2C, the vehicle 3F transmits the specified collected raw data to the edge server 2C.

In S3, the edge server 2C generates map update data based on the raw data acquired from the vehicle 3F and the latest map data. Since this method has been described with reference to FIG. 4, the description thereof will not be repeated.

The edge server 2C broadcasts a transaction including the generated map update data to the network NW. Thus, the generated map update data is propagated to the other servers (the edge server 2D and the cloud server 1A) constituting the same block chain B1 (S4 and S5).

In S6 to S8, each of the edge servers 2C and 2D and the cloud server 1A adds map update data to the block chain. By using the block chain technology, the update history of the map data can be recorded. In addition, the validness of map update data can be improved and the traceability can be improved.

In S9, the edge server 2C determines whether or not the map update data is valid in accordance with a predetermined verification policy. Since the verification method has been described with reference to FIG. 4, the description thereof will not be repeated. When it is determined as being valid as a result of the verification, the edge server 2C updates the map data using the map update data (S10). On the other hand, when it is determined that the map update data is invalid, the edge server 2C does not update the map data using the map update data.

As described above, in the present embodiment, only the map update data determined as being valid as a result of verification is used for updating map data. When the number of vehicles from which the raw data are acquired is small or the matching ratio of the map update data is low, it is determined that the map update data is invalid. Thereby, the map update data having high reliability (high accuracy of whether consistent results are obtained if similar measurements are repeated at the same point) is selected and used for updating the map data. Therefore, according to the present embodiment, the accuracy of map data can be improved.

[Modification 1]

In the embodiment, the configuration in which the edge server generates map update data has been described. In Modification 1, a configuration in which map update data is generated on the vehicle side will be described.

Figure 6:
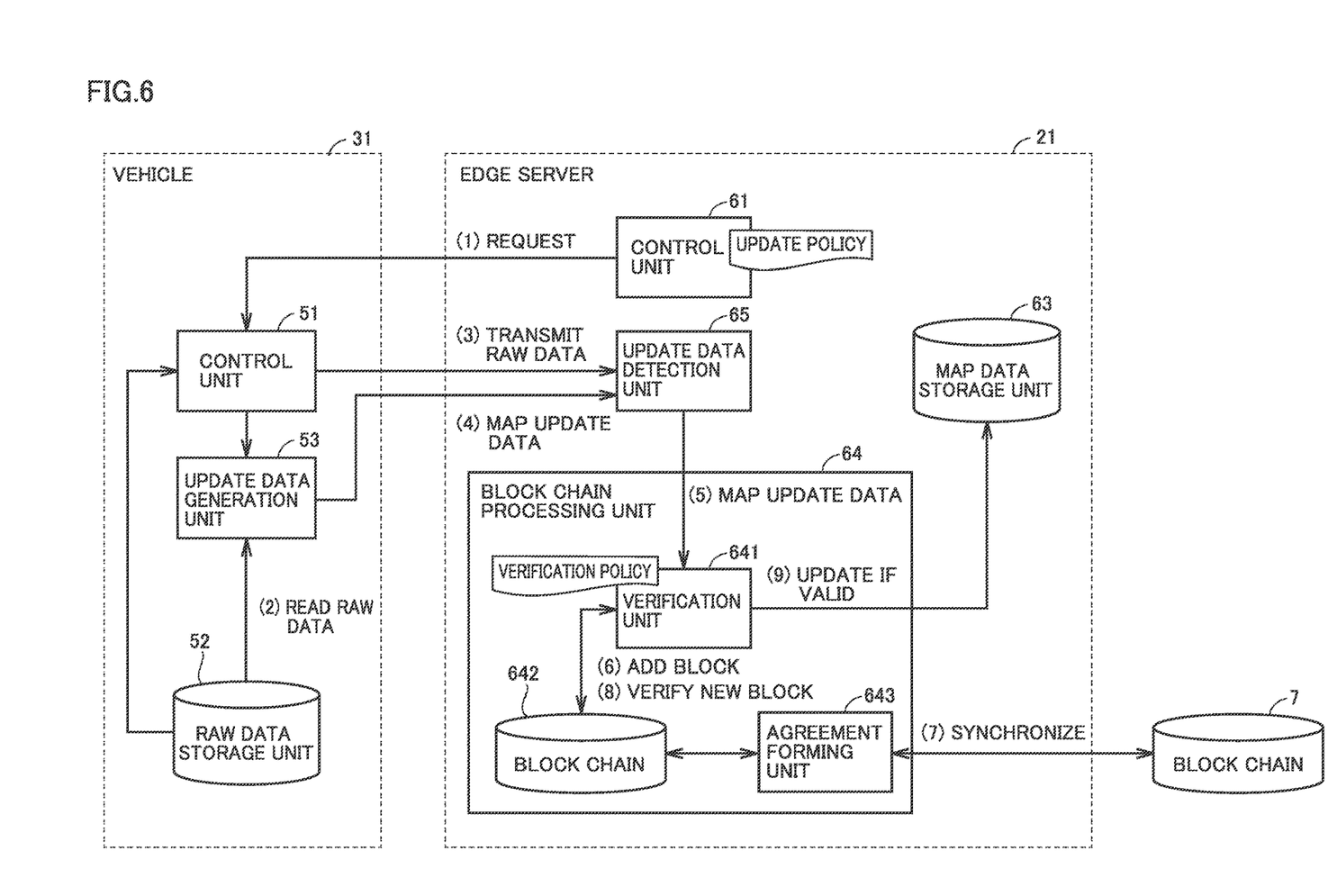
FIG. 6 is a functional block diagram relating to main functions of an edge server and a vehicle according to Modification 1 of the embodiment.

FIG. 6 is a functional block diagram relating to main functions of an edge server and a vehicle according to Modification 1 of the embodiment. The vehicle 31 differs from the vehicle 3 (see FIG. 4) in the embodiment in that the vehicle 31 further includes an update data generation unit 53. The edge server 21 differs from the edge server 2 (see FIG. 4) in the embodiment in that it includes an update data detection unit 65 instead of the update data generation unit 62.

The update data generation unit 53 of the vehicle 31 reads the raw data from the raw data storage unit 52 in accordance with an instruction from the control unit 51 (see (2)). The update data generation unit 53 compares the raw data with the map data transmitted from the edge server 21 and stored in the storage, to determine whether or not the target point has changed. When the target point has changed, the update data generation unit 62 generates map update data relating to the target point, and transmits the generated map update data to the update data detection unit 65 of the vehicle 31 (see (4)). When detecting reception of the map update data, the update data detection unit 65 outputs the map update data to the verification unit 641. Since the processing other than the above is the same as the corresponding processing in the embodiment, detailed description thereof will not be repeated.

[Modification 2]

In FIG. 5, the configuration has been described in which a trigger (specifically, a request to transmit raw data) for updating map data is sent from the edge server 2C to the vehicle 3F. In Modification 2, a configuration in which a trigger is issued from the vehicle side will be described.

Figure 7:
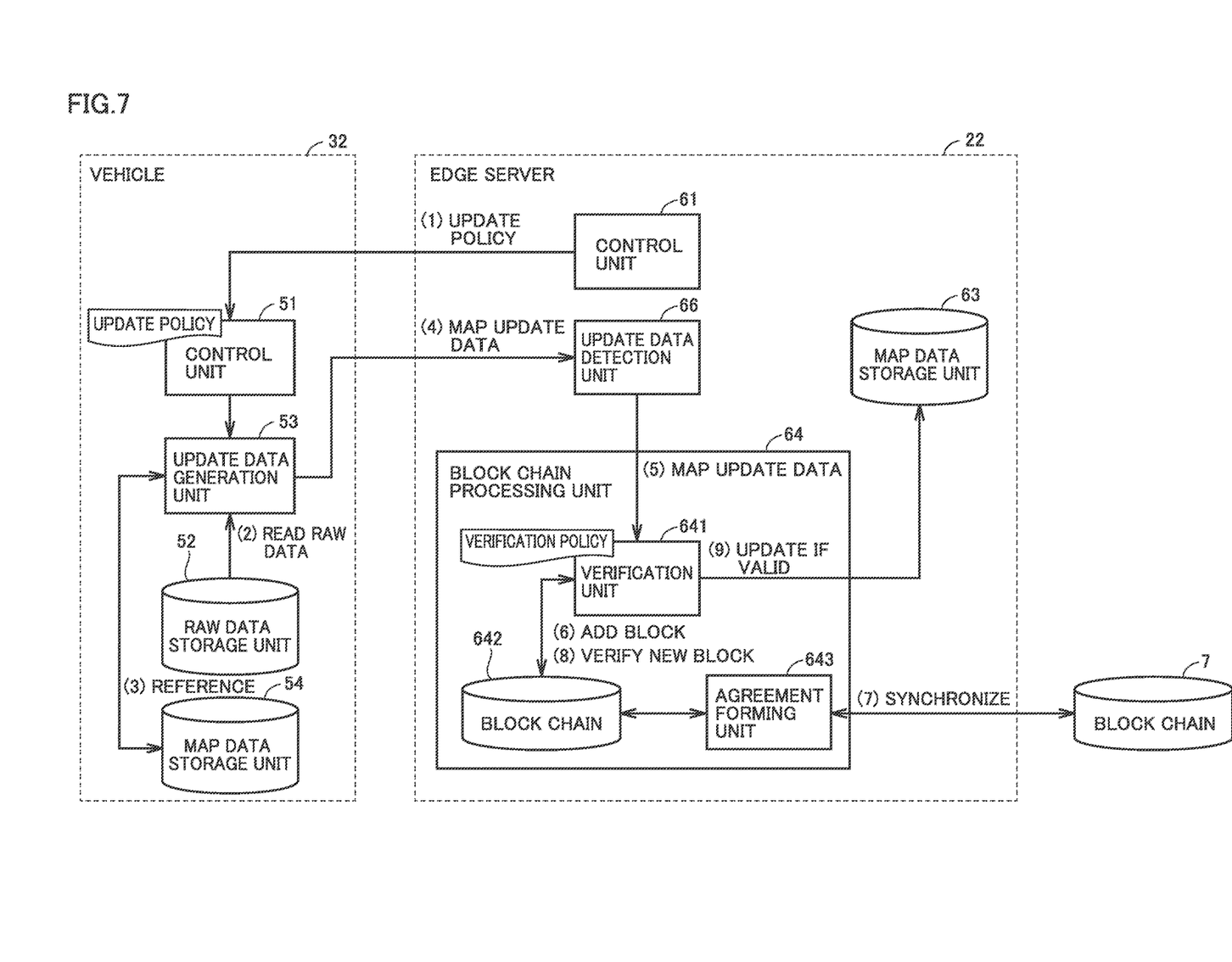
FIG. 7 is a functional block diagram relating to main functions of an edge server and a vehicle according to Modification 2 of the embodiment.

FIG. 7 is a functional block diagram relating to main functions of an edge server and a vehicle according to Modification 2 of the embodiment. In this modification, the update policy is transmitted from the control unit 61 of the edge server 22 to the control unit 51 of the vehicle 32 in advance (see (1)). The vehicle 32 differs from the vehicle 31 (see FIG. 6) of Modification 1 in that the vehicle 32 further includes a map data storage unit 54.

The update data generation unit 53 acquires raw data from the raw data storage unit 52 according to the update policy (see (2)). The update data generation unit 53 acquires map data stored in the map data storage unit 54. Then, the update data generation unit 53 compares the raw data with the map data to determine whether or not the target point has changed (see (3)). When the target point has changed, the update data generation unit 62 generates map update data relating to the target point, and transmits the generated map update data to the update data detection unit 66 of the vehicle 32 (see (4)). When detecting reception of the map update data, the update data detection unit 66 outputs the map update data to the verification unit 641. Since the processing other than the above is the same as the corresponding processing in the embodiment, detailed description thereof will not be repeated.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A map management system comprising
a plurality of servers that manage map data of a predetermined area,
the plurality of servers each comprising:
 a storage that stores a block chain; and
 a processor that stores, in the block chain, a plurality of pieces of map update data for updating the map data, the plurality of pieces of map update data being generated based on vehicle data from a plurality of vehicles traveling in the predetermined area, wherein
the processor
 updates the map data by selectively using map update data determined, by executing a verification process of map update data defined in a smart contract implemented using a framework of the block chain, as satisfying a predetermined verification policy and thus being valid, among the plurality of pieces of map update data, and
 generates a map with the map update data,
the verification process is determined based on a number of the plurality of vehicles from which the vehicle data is acquired, and a matching ratio of the plurality of pieces of map update data, all of the plurality of pieces of map update data is stored in the block chain regardless of whether or not the plurality of pieces of map update data are valid, the plurality of servers comprise a cloud server and a plurality of edge servers, and the plurality of edge servers each generate the plurality of pieces of map update data based on the vehicle data collected from the plurality of vehicles, and broadcast transaction data including the plurality of pieces of map update data to share the plurality of pieces of map update data between the cloud server and the plurality of edge servers.

2. The map management system according to claim 1, wherein the processor determines map update data that satisfy:

the number of the plurality of vehicles from is larger than a reference number; and the matching ratio is higher than a reference ratio, as being valid, among the plurality of pieces of map update data.

\* \* \* \* \*